United States Patent [19]

Jameson et al.

[11] Patent Number: 4,553,023

[45] Date of Patent: Nov. 12, 1985

[54] THERMALLY INSULATED ELECTRICALLY HEATED HOSE FOR TRANSMITTING HOT LIQUIDS

[75] Inventors: Calvin R. Jameson, Atlanta; Robert G. Baker, Buford, both of Ga.

[73] Assignee: Nordson Corporation, Amherst, Ohio

[21] Appl. No.: 569,976

[22] Filed: Jan. 11, 1984

Related U.S. Application Data

[63] Continuation-in-part of Ser. No. 325,389, Nov. 27, 1981, Pat. No. 4,455,474.

[51] Int. Cl.$^4$ .......................... H05B 3/58; F16L 11/12; F16L 53/00; B67D 5/62
[52] U.S. Cl. ...................................... 219/301; 137/341; 138/33; 174/47; 219/308; 219/522; 222/146.5
[58] Field of Search ................ 219/298, 299, 300, 301, 219/307, 308, 522, 547; 137/341; 174/47; 222/146.5; 138/33

[56] References Cited

U.S. PATENT DOCUMENTS

| | | |
|---|---|---|
| 456,271 | 7/1891 | Herrick . |
| 746,319 | 12/1903 | Frees . |
| 1,296,952 | 3/1919 | Handley . |
| 1,809,714 | 6/1931 | Mathews . |
| 2,243,220 | 5/1941 | Pitman ...................... 219/301 X |
| 2,793,280 | 5/1957 | Harvey ...................... 219/301 X |
| 3,019,325 | 1/1962 | Clouse ...................... 219/301 X |
| 3,097,288 | 7/1963 | Dunlap ............................. 219/307 |
| 3,288,170 | 11/1966 | Haren . |
| 3,522,413 | 8/1970 | Chrow ............................. 219/301 |
| 3,543,803 | 12/1970 | Chrow ...................... 219/301 X |
| 3,585,361 | 6/1971 | Rosen et al. ............ 219/301 X |
| 3,603,403 | 9/1971 | Horwinski ............... 219/301 X |
| 3,727,029 | 4/1973 | Chrow ............................. 219/301 |
| 3,814,138 | 6/1974 | Courtot . |
| 3,916,953 | 11/1975 | Nagayoshi et al. . |
| 4,007,070 | 2/1977 | Busdiecker . |
| 4,038,519 | 7/1977 | Foucras ......................... 219/301 |
| 4,186,778 | 2/1980 | Carey . |
| 4,194,536 | 3/1980 | Stine et al. ................. 219/301 X |
| 4,224,463 | 9/1980 | Koerber et al. . |
| 4,229,613 | 10/1980 | Braun ................................ 174/47 |
| 4,323,174 | 4/1982 | Wood .............................. 222/146.5 |
| 4,455,474 | 6/1984 | Jameson et al. ............. 219/522 X |

FOREIGN PATENT DOCUMENTS

| | | |
|---|---|---|
| 1525742 | 3/1972 | Fed. Rep. of Germany . |
| 2709717 | 9/1977 | Fed. Rep. of Germany . |
| 725162 | 3/1955 | United Kingdom . |
| 897292 | 5/1962 | United Kingdom . |
| 1120482 | 7/1968 | United Kingdom . |

Primary Examiner—A. Bartis
Attorney, Agent, or Firm—Wood, Herron & Evans

[57] ABSTRACT

A flexible heated hose for transporting molten adhesive from a melter to a dispenser. The hose comprises a Teflon tube contained within stainless steel braided wire and fitted with conventional hydraulic fittings at each end. The braided tube is encased within a multiple ply covering which includes a first layer of fiberglass tape around which are wound electrical resistance heating wires, a resistance temperature detector, electrical leads including a ground wire, and two plies of helically wound fiberglass tape, with a layer of helically wound Aramid fiber, two layers of helically wound polyester felt, and a layer of helically wound vinyl tape covering the same. The heating wires, electrical leads, and temperature detector are adhesively secured to the first layer of fiberglass tape which is in turn adhesively secured to the stainless steel braided wire covering the Teflon tube. In a modified embodiment, the ground wire is wound separate from the other electrical leads. A braided polyester cover forms the exterior of the hose, with hard molded plastic cuffs attached to the ends of the hose. The electrical leads to the heating wires, temperature detector and dispenser extend radially from the hose through holes in the cuffs. Electrical plug-in adapters are attached to the ends of the electrical leads.

6 Claims, 8 Drawing Figures

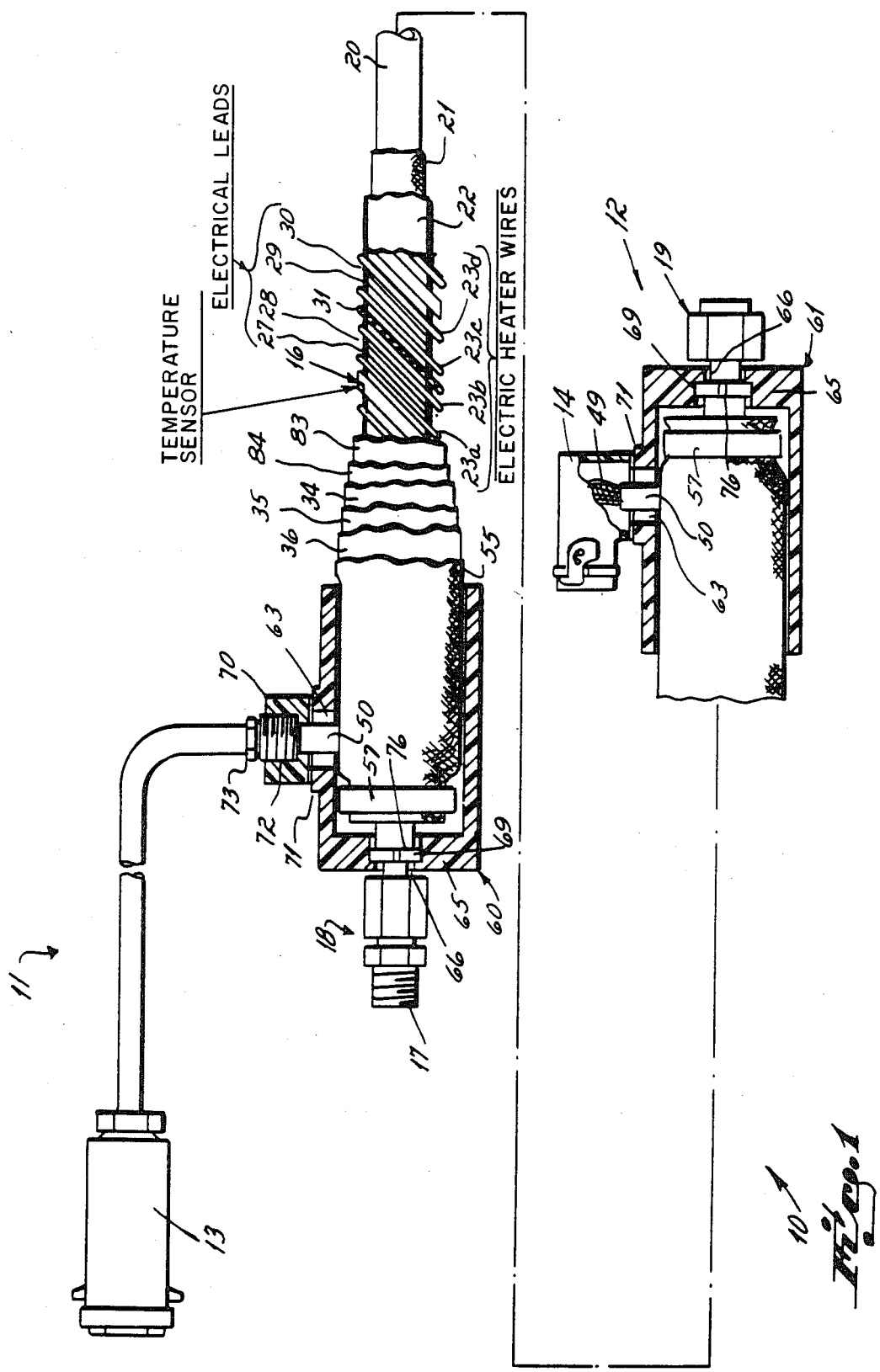

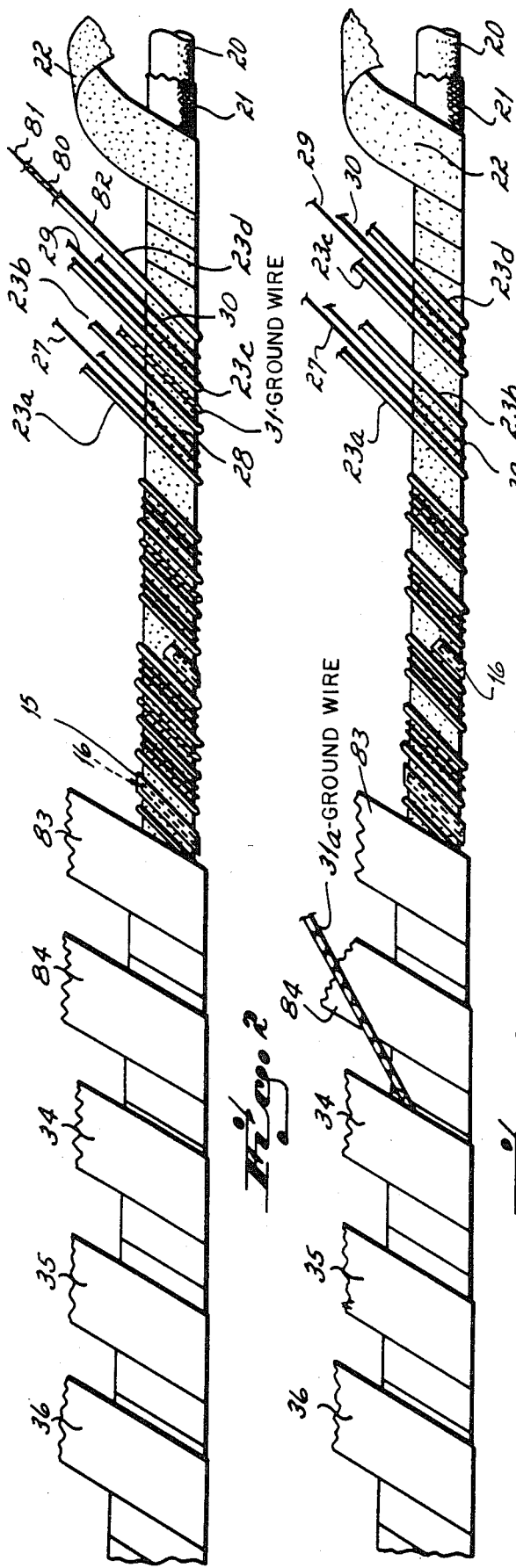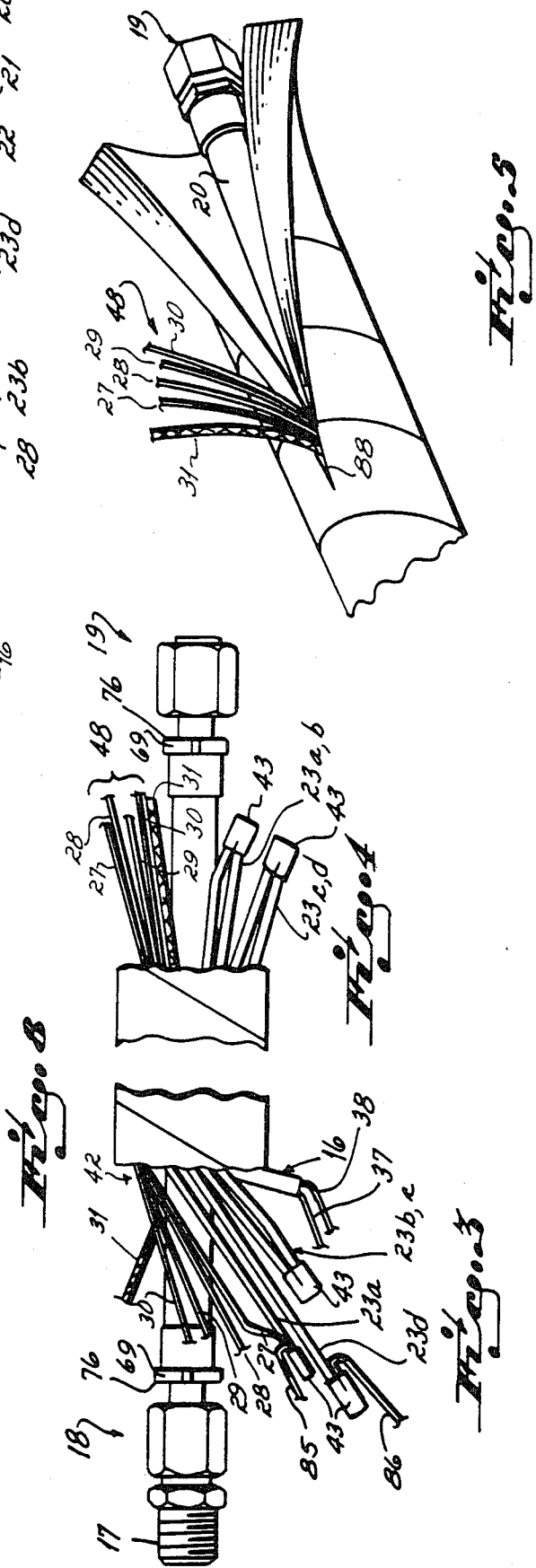

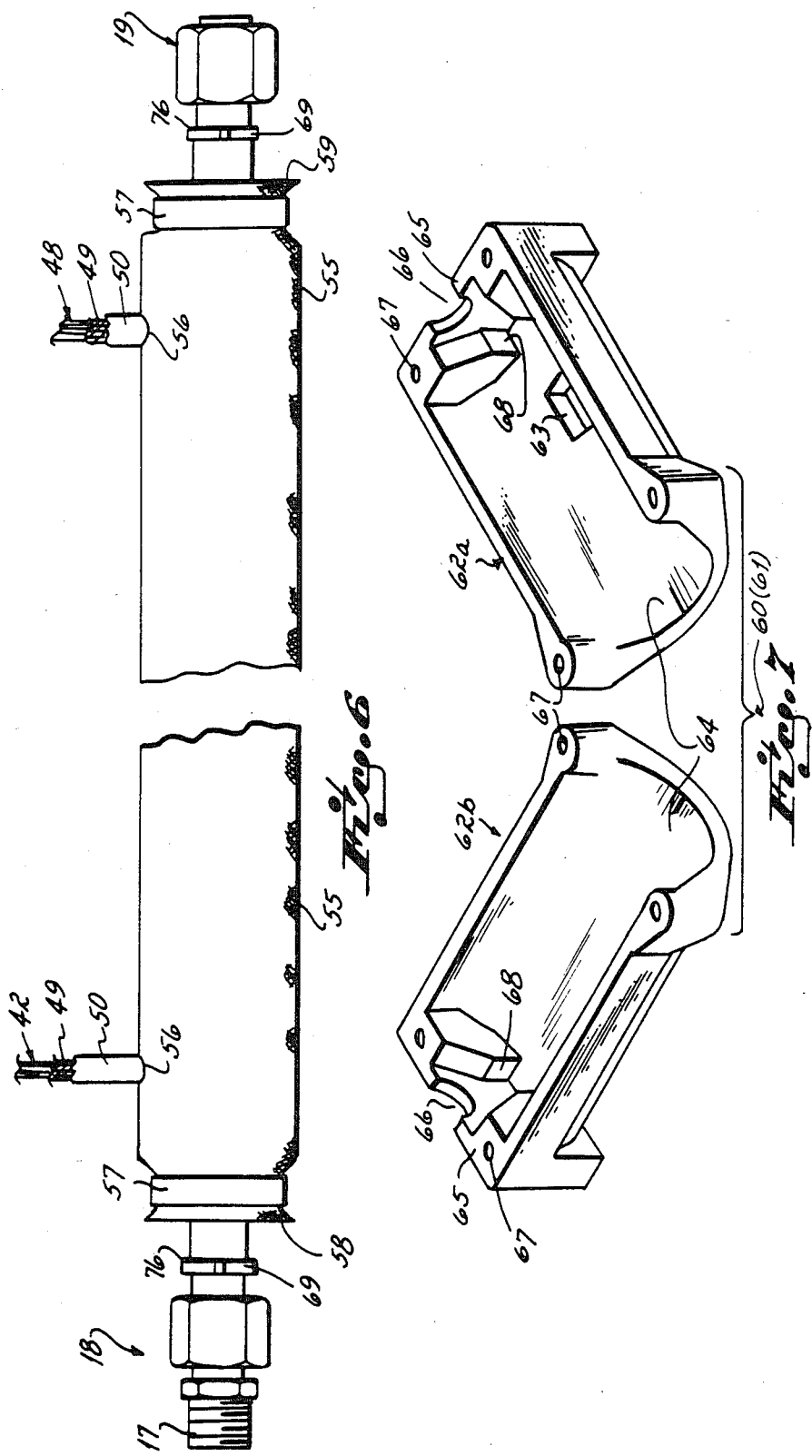

THERMALLY INSULATED ELECTRICALLY HEATED HOSE FOR TRANSMITTING HOT LIQUIDS

This application is a continuation-in-part of U.S. Ser. No. 325,389 filed Nov. 27, 1981 now U.S. Pat. No. 4,455,474, issued June 19, 1984.

FIELD OF THE INVENTION

This invention relates to heated tubing and more particularly to a heated hose for conveying molten adhesive.

BACKGROUND OF THE INVENTION

Thermoplastic adhesives or so-called "hot melt" adhesives are now widely used to secure substrates together in a great variety of applications. These hot melt materials are essentially solvent free adhesives which are applied in a molten state and form a bond upon cooling to a solid state. By reason of their quick setting characteristics, their adhesive "tack" and their gap filling properties, they are used in many industrial adhesive applications. For example, such adhesives are now commonly used in the assembly and manufacture of automobiles, furniture, aircraft sub-assemblies and the like. Many of those assembly operations utilize production line techniques wherein the adhesive applicator must be moved by an operator to and around the assembly part during application of the adhesive to the substrate. In such applications the adhesive is quite commonly applied to the substrate by an adhesive hand gun to which the molten adhesive is supplied through a flexible hose. In this type of system the molten feed stock or molten adhesive is converted from the solid state (e.g., pellets, bulk, or chunks) to a molten state by a melter structure such as a melting tank. The molten feed stock is then pumped from the melter structure to a gun or dispenser through a feed hose within which the molten feed stock is maintained at a temperature on the order of 350° F. and a pressure of several hundred pounds per square inch. That feed hose as well as the dispenser gun or hand gun to which the hose supplies the molten feed stock are both commonly heated so as to maintain the feed stock in the molten state when the gun is not being used to dispense material, or to re-melt the feed stock if the gun is shut down for an extended period, i.e., overnight, between shifts, etc.

These feed hoses are handled and quite often come into contact with operators who are handling the dispensing guns to which the hoses are attached. Therefore, the hoses are very well insulated so as to maintain molten material on the inside of the hose at 350° F. and still be only warm to the touch on the outside of the hose. In the past this hose insulation has been subject to failure and it has therefore been an objective of this invention to provide an improved hot melt adhesive dispensing hose which is not subject to insulation degradation and ultimate resulting failure of the hose.

Another problem encountered with prior hot melt adhesive dispensing hoses is the very substantial power requirements required for those hoses to maintain a preset temperature of molten adhesive within the hose. It has, therefore, been another objective of this invention to provide an improved hose which has less thermal heat loss and therefore requires less power to maintain the molten adhesive at a preset temperature within the hose.

Still another objective of this invention has been to provide an improved hose which is less expensive to manufacture than hoses which have been used in the past for transporting hot melt adhesive from a melter to a dispensing gun.

SUMMARY OF THE INVENTION

These objectives are achieved and this invention is predicated upon an improved hot melt adhesive distribution hose which comprises a Teflon tube encased within stainless steel braiding. This braided tube has conventional hydraulic swivel fittings secured to its opposite ends. Electrical heating wires, a temperature sensor, and electrical leads (including a ground wire) are all wrapped around a layer of woven fiberglass tape with adhesive on both sides covering the steel braiding. The heater wires, sensor and electrical leads are covered by successive helically wrapped layers of fiberglass tape, Aramid fiber, at least one layer of polyester felt, and a layer of vinyl tape. A braided polyester cover forms the exterior to the hose. A modified version of this embodiment adapted for hoses using an uninsulated ground wire provides for the ground wire to be isolated by separately encasing it between the Aramid fiber layer and first polyester felt layer.

The electrical leads within the hose extend radially from one side through two piece molded plastic cuffs attached to each end of the hose. Electrical plug adapters are attached to the ends of the electrical leads so that the electrical leads from the gun and the control system may be plugged into these adapters.

The primary advantage of the invention is that it provides an improved hose which is less subject to failure because of degradation of the insulation of the hose, which is more easily and safely attached to the dispensing gun, and which is easier and less expensive to manufacture than prior art hoses suitable for this application.

These and other objects and advantages of this invention will be more readily apparent from the following description of the drawings in which:

BRIEF DESCRIPTION OF THE DRAWINGS

FIG. 1 is a side elevational view partially broken away and partially in cross section of a hot melt adhesive transporting hose incorporating the invention of this application.

FIG. 2 is a side elevational views of one section of the hose of FIG. 1 illustrating the wrapping sequence employed in the manufacture of the hose.

FIG. 3 is a side elevational view illustrating the electrical connections at one end of the hose.

FIG. 4 is a side elevational view illustrating the electrical connections at the other end of the hose.

FIG. 5 is a perspective view illustrating how the electrical lead bundle is brought out through the jacket.

FIG. 6 is a side elevational view of the hose before the end cuffs and electrical connections are applied thereto.

FIG. 7 is a perspective view of the two piece cuff before attachment to the ends of the hose.

FIG. 8 is a side elevational view of a section of hose illustrating the wrapping sequence employed in the manufacture of a hose according to another embodiment of the invention.

DETAILED DESCRIPTION OF THE INVENTION

With reference first to FIG. 1 there is illustrated a heated hose 10 for transporting molten thermoplastic material or so-called "hot melt" material from a melter tank (not shown) to a dispensing gun (not shown). The melter tank or source of molten material is intended to be attached to the unit end 11 of the hose and the dispensing gun is intended to be attached to the gun end 12. As explained more fully hereinafter, the unit end 11 of the hose is equipped with an electrical plug 13 which is intended to connect the electrical leads of the hose to a control panel at the melter. Similarly, the gun end 12 of the hose is equipped with an electrical plug 14 for connecting electrical leads contained within the hose to a mating plug connected by electrical means to electrical components of the gun.

In general, this hose 10 is intended to transport molten adhesive at a pressure of several hundred psi and at a temperature on the order of 250° F.-350° F. while maintaining the material at that temperature. Additionally, the hose is sometimes required to melt material contained within the hose if that material should cool and solidify, as it commonly does between shifts or overnight when the dispenser gun with which the hose is utilized is inoperative. To that end, the hose includes electrical resistance heater wires 23a-23d contained within the hose and extending for the length of the hose. These heater wires 23a-23d are covered by insulative material so as to enable the hose to be contacted or touched by the operator of the dispensing gun without any physical harm.

With reference now to FIGS. 2-7, there is illustrated the sequence of operations employed to manufacture one embodiment of the hose 10. This sequence starts with a Teflon tube 20 braided with a stainless steel wire braiding 21. Teflon is chosen for this application because it is one of the few polymeric materials which will withstand the relatively high temperature at which molten thermoplastic adhesive is maintained as it is pumped from one place to another. However, Teflon will not withstand the relatively high pressures at which this material is usually pumped, i.e., on the order of 200 psi, and therefore the Teflon tube is encased within the stainless steel metal braiding 21.

Extending from each end of the Teflon tube 20 there is a conventional hydraulic female swivel 18, 19. The swivel 18 at the unit end 11 of the hose is fitted with a threaded male adapter plug 17 so as to enable the fitting to be attached to a conventional hot melt adhesive melting unit.

The braided tube is wrapped with a double-sided fiberglass electrical tape 22 (FIG. 2) which is helically wrapped in overlapping fashion for the length of the tube 20. The tape 22 is referred to as double-sided because it has thermosetting adhesive on both sides. Consequently, it adheres to the braiding 21 of the tube and to the wires, e.g. heater wires 23a-23d, which are helically wound over the fiberglass tape 22.

Four heater wires 23a-23d are used to heat the length of the hose 10. The heater wires 23a-23d are conventional commercially purchasable 250° C. heater wires rated at 26 ohms/foot. The wires 23a-23d each have an electrical resistance heating wire 80 which is spirally wound on an insulative core 81. The wires 23a-23d each have a flexible silicone rubber insulative covering 82. The heater wires 23a-23d have the advantage of being less expensive than heater tapes, for example, and have better resistance to abrasion through flexion of the hose, and further can be wrapped in a manner to provide more heat over a broader area of hose surface.

Located between two of the heater wires 23a-23d at a mid-point in the length of the hose is a conventional resistance temperature detector (RTD) 16 helically wrapped about the hose over the double-sided fiberglass tape 22. The RTD is secured in place with a layer 15 of single-sided electric tape. This temperature detector 16 is located approximately 18" from the unit end 11 of the hose. Since the RTD is a commercially available item, it has not been described in detail herein.

Wrapped around the fiberglass tape 22 with the heater wires 23a-23d are five electrical leads 27, 28, 29, 30 and 31. Four of these leads 27, 28, 29 and 30 are insulated leads and the fifth lead 31 is a braided ground wire which may be covered with an insulative material. Two of the leads 27, 28 are intended to be connected to the heater of the dispensing gun (not shown) and two leads 28, 30 are intended to be connected to the temperature controller of the dispensing gun. The ground wire 31 serves to ground the dispensing gun. It has been found advantageous to wrap these leads such that leads 27 and 28 are in the space between heater wires 23a, and 23b, ground wire 31 is in the space between heater wires 23b and 23c, and leads 29 and 30 are in the space between heater wires 23c and 23d.

After application of the heater wires 23a-23d, the RTD 16 and electrical leads 27-31, the tube is then helically wrapped in overlapping fashion (i.e. 50% overlap) with woven fiberglass tape 83 having adhesive on one side. By overlapping the helically wound fiber glass tape 83 for half of its width, the single ply wrap results in a double thickness of material for the length of the tube 20.

A layer of Aramid fiber material 84, available from DuPont under the name NOMEX, is then wrapped in overlapping fashion over the fiberglass tape 83. The Aramid fiber provides thermal insulation.

Next covering the tube 20 is a first layer of polyester felt 34, such as Fiberdyne E275, with an additional preferred layer of polyester felt 35. Again, both layers 34 and 35 are respectively helically wrapped around the tube with a 50% overlap to provide, in effect, a double thickness to each layer. The two layers of polyester felt 34 and 35 are then followed with a single thickness layer of helically wound vinyl electrical tape 35 which functions as a moisture barrier over the felt.

With reference to FIGS. 3 and 4, the electrical connections of the heater wires 23a-23d are shown. The four heater wires are connected in series by means of crimped splicers 43, for example. Interconnecting the ends of the heater wires 23a-23d in this manner enables an electrical circuit to be completed through the wires with the result that there is no need for a separate return wire. The ends of heater wires 23a and 23d are connected by conventional crimped splices, for example, to electrical power leads 85 and 86. These electrical connections are ordinarily made before applying the fiberglass tape layer 83 to the tube 20. In this embodiment, the electrical leads 28-31 and RTD leads 37 and 38 are left unspliced adjacent the tube body, it being understood that appropriate electrical connections can be effected at another point, as desired. Lead 27 is shown connected to power lead 85 with the crimp splice for heater wire 23a to provide power to a gun heater (not shown). Electrical lead 28 provides the return completing this circuit.

Rather than cut away or trim back the insulative layers at the ends of the tube to access the various lead ends and heater wires, with subsequent rewrapping of these areas, a slit 88 is made longitudinally through the plies of the wrapping insulating material. As shown in FIG. 5, the insulative layers wrapped around the heater wires 23a–23d and electrical leads 27–31 are slit adjacent one end of the hose, the insulative material pulled back, and electrical leads 27–31 then pulled through the slit. The slit is then closed with a portion of electrical vinyl tape (not shown) wrapped thereabout. Only one end of the hose is illustrated herein in regard to this slitting operation, it being understood that a like operation is carried out at the other hose end.

A modified version of the foregoing embodiment is shown in FIG. 8. Where a larger and non-insulated ground wire 31a is used with the hose, such as in a longer hose application of 8 feet in length or more, for example, the ground wire 31a is wrapped separately from the electrical leads 27–30 and heater wires 23a–23d, as between layers 84 and 34. The ground wire 31a is helically wrapped about the tube, although at a different pitch from that of the leads and heater wires.

In either embodiment the electrical leads at each end of the hose are arranged into bundles 42, 48 within a braided fiberglass sleeve 49 covered by a thermoplastic elastomeric tube 50 which extends radially from the side of the hose.

The full length of the hose is then covered with a braided polyester cover 55 having holes 56 through which the bundled electrical leads 42, 48 extend radially from the hose (FIG. 6). Conventional metal bands 57 are then clamped over the ends of the hose so as to clamp the insulative materials in compression with the band. The ends of the insulative material are then trimmed as indicated at 58, 59 preparatory to attachment of hard molded plastic cuffs 60, 61 over the ends of the hose. Cuffs 60, 61 (FIG. 7) such as are the subject of applicants' assignee's pending U.S. Pat. application Ser. No. 512,157 may be advantageously used.

The two cuffs 60, 61 attached to the opposite ends of the hose 10 are identical and therefore only a single cuff will be described. It should be appreciated that an identical cuff is attached to both ends of the hose.

With reference to FIG. 7 it will be seen that the cuff 60 comprises two substantially identical halves 62a, 62b which differ only in that one-half 62a is provided with a radial hole 63 through which the bundle of electrical leads contained within sleeve 49 and tube 50 extend. Each half 62a, 62b comprises a semi-circular tubular section 64 having one closed end 65. The closed end has a semi-circular hole 66 in the center such that, when the two halves are put together, the semi-circular holes 66 combine to form a circular hole through the otherwise closed end of the cuff. The two halves of the cuff are secured together by four screws (not shown) which extend through four matching holes 67 formed in each half of the cuff.

Formed on the interior of the end walls 65 of each half of the cuff there is preferably a Y-Shaped groove 68. When the cuff is assembled over the end of the hose this Y-shaped groove mates with flats 69 (FIG. 1) formed on a hexagonal portion 76 of the swivel fitting 18, 19 so as to prevent the cuff from rotating relative to the hose.

With reference to FIG. 1, it will be seen that the bundle of electrical leads at the unit end of the hose extend through the hole or aperture 63 in the side of the cuff 60. A plastic block 70 having a threaded bore 72 is bolted by conventional fasteners (not shown) to a boss 71 formed on the side of the cuff surrounding the aperture 63. Within the threaded bore 72 of this block there is a threaded nut through which the bundle of electrical leads extend. A nut 73 is compressed over the bundle of leads and a grommet (not shown) contained internally of the nut frictionally secures the nut to the sleeve 49 and tubing 50 surrounding the bundle of leads so as to prevent the bundle of leads from being pulled radially from the hose 10.

The outer end of the tube 50 containing the bundle of electrical leads extends into a conventional commercially available electrical plug 13. This plug has multiple pins adapted to be received within pins of the control section of a melter unit so as to electrically connect the leads of the hose to the electrical leads of the control unit.

On the gun end 12 of the hose 10 the cuff 61 is secured against rotation relative to the hose by engagement of flats of the Y-shaped slot 68 with flats 69 on the hexagonal shaped section 76 of the hydraulic fitting 19. The tube 50 containing the electrical leads at the gun end of the hose extends through the hole 63 in the cuff 61. Mounted upon the boss 71 surrounding the aperture 63 there is a conventional commercially available electrical plug 14 to pins of which the leads contained within the tube 50 are connected. This plug is attached to the cuff by conventional screws or threaded connectors (not shown). The plug preferably is of the type which has a rotatable cam attached to it and adapted to cooperate with a cam surface of a mating plug so as to secure a mating plug to the plug 14. The plug 14 is adapted to receive the mating plug of a flexible electrical lead from the dispenser gun to which the gun end of the hose is intended to be connected. Such a lead would connect the leads 27–31 of the hose with a heater, temperature controlled element, and ground contained within the gun.

The primary advantage of the hose hereinabove described is that it is less subject to failure than presently available commercial hoses suited for similar applications. It is also much less costly and easier to manufacture than presently available hoses for such application. This hose also has the advantage of being more easily connected to thermoplastic melters and dispensing guns than most hoses available for this purpose.

While we have described a preferred form of our invention, persons skilled in this art will appreciate changes and modifications which may be made without departing from the spirit of our invention. Therefore, we do not intend to be limited except by the scope of the following claims:

We claim:

1. A flexible heated hose of substantially uniform construction throughout its length for transmitting hot liquid material comprising:
a flexible polymeric tube contained within a braided stainless steel covering, said tube having metallic hydraulic fittings sealingly attached to opposite ends,
a first layer of woven fiberglass helically wound around said braided stainless steel covering, said first layer being coated on its opposite sides with a thermosetting adhesive, at least one electrical heating line helically wound around and adhesively secured to said first layer of woven fiberglass, by said adhesive coating on said first layer, electrical leads connected to said at least one electrical heating line for supplying electrical power thereto, temperature detecting means adhesively secured to said first layer of woven fiberglass by the adhesive coating on said first layer, and electrical leads helically wrapped around said first layer of woven fiberglass and extending from said temperature detecting means to one end of said hose, a second layer of woven fiberglass helically wound over said at least one electrical heating line, said temperature detecting means, and said temperature detecting means leads, said second layer of woven fiberglass being coated on the inside surface with a thermosetting adhesive so as to secure said at least one electrical heating line, temperature detecting means and temperature detecting means leads against movement relative to said tube, a third layer of thermal-insulative material helically wound over said second layer, said third layer acting as a thermal barrier to heat loss from said hose, a fourth layer of at least one thickness of polyester felt helically wrapped over said third layer, a fifth layer of vinyl electrical tape helically wrapped over said fourth layer, said fifth layer providing a moisture barrier for said hose, at least two electrical leads operative to transmit electrical power for the length of the hose helically wrapped along said tube internally of said fifth layer and a braided polyester cover over said fifth layer 2. The hose of claim 1, wherein said at least one electrical heating line is an electrical resistance wire having a silicone rubber covering.

3. The hose of claim 1, wherein the at least two electrical leads are helically wrapped with the at least one electrical heating line about said first layer of woven fiberglass.

4. The hose of claim 1, wherein the at least two electrical leads include an uninsulated ground wire, and wherein the ground wire is helically wrapped about the tube between the third and fourth layers, and the remaining electrical leads are wrapped with the at least one heating line around said first layer and at a different pitch from that of said ground wire.

5. The hose of claim 1, which further includes a metal band compressively secured around the ends of said hose over said braided polyester cover, a molded plastic cuff secured over each end of said hose, each of said cuffs having an opening in one side of said cuff, the ends of all of said electrical leads extending through the overlying layers through said braided polyester cover, and through said opening in one of said cuffs.

6. A flexible heated hose of substantially uniform construction throughout its length for transmitting hot liquid material comprising:

a flexible polymeric tube contained within a braided stainless steel covering, said tube having metallic hydraulic fittings sealingly attached to opposite ends, a first layer of woven fiberglass helically wound around said braided stainless steel covering, said first layer being coated on its opposite sides with a thermosetting adhesive, plural electrical heating lines helically wound in parallel fashion around and adhesively secured to said first layer of woven fiberglass by the adhesive coating on said first layer, said electrical heating lines being connected in series, two electrical leads connected to said plural electrical heating lines for supplying electrical power thereto, at least two electrical leads helically wrapped with said plural electrical heating lines around and adhesively secured to said first layer of woven fiberglass by the adhesive coating of said first layer, said at least two electrical leads being operative to transmit electrical power for the length of said hose, a temperature detector adhesviely secured to said first layer of woven fiberglass, and electrical leads helically wrapped around said first layer of woven fiberglass and extending from said temperature detector to one end of said hose, a second layer of woven fiberglass helically wound over said plural heating lines, said temperature detector and said temperature detector leads, and said at least two electrical leads, said second layer of woven fiberglass being coated on the inside surface with a thermosetting adhesive so as to secure said plural electrical heating lines, temperature detector and temperature detector leads, and at least two electrical leads against movement relative to said tube, a third layer of thermo-insulative material helically wound over said second layer, said third layer acting as a thermal barrier to heat loss from said hose, a fourth layer of at least one thickness of polyester felt helically wrapped over said third layer, a fifth layer of vinyl electrical tape helically wrapped over said fourth layer, said fifth layer providing a moisture barrier for said hose, and a braided polyester cover over said fifth layer.

* * * * *